United States Patent [19]

Brandstadter

[11] Patent Number: 5,178,405
[45] Date of Patent: Jan. 12, 1993

[54] HYDROMECHANICAL CONTROL SYSTEM

[75] Inventor: Jack M. Brandstadter, Royal Oak, Mich.

[73] Assignee: Cadillac Gage Textron Inc., Warren, Mich.

[21] Appl. No.: 614,920

[22] Filed: Nov. 15, 1990

[51] Int. Cl.⁵ .............................................. B60G 11/26
[52] U.S. Cl. ...................................... 280/705; 280/723
[58] Field of Search ............... 280/705, 723, 702, 709, 280/683, 698; 180/9.1

[56] References Cited

U.S. PATENT DOCUMENTS

| | | | |
|---|---|---|---|
| 3,374,005 | 3/1968 | Dunlow et al. | 280/705 |
| 4,194,761 | 3/1980 | Falk et al. | 280/705 |
| 4,447,073 | 5/1984 | Brandstadter | 280/705 |
| 4,513,833 | 4/1985 | Sheldon | 280/705 |

Primary Examiner—Kenneth R. Rice
Attorney, Agent, or Firm—Reising, Ethington, Barnard, Perry & Milton

[57] ABSTRACT

A hydromechanical pressure control system includes a dual pump and cam assembly, which operates in association with an orifice and a relief valve to develop a pressure for operating a multiple disk friction damper. In one embodiment, the friction damper is associated with a torsion bar for spring supporting a vehicle hull on a road arm, which has a spindle for connection to a road wheel, and the cam is configured to operate two pumps to produce a pressure on the friction damper for damping of both jounce and rebound movements of the road wheel relative to the hull, independently of the relative position of the hull and the road wheel during terrain induced movements of the vehicle and its road wheels and wherein a snubber and the torsion bar system improve the energy absorption and energy storage characteristics of the suspension system to thereby improve the ride quality and handling characteristics of said vehicle and to reduce energy requirements when operating off-road.

16 Claims, 10 Drawing Sheets

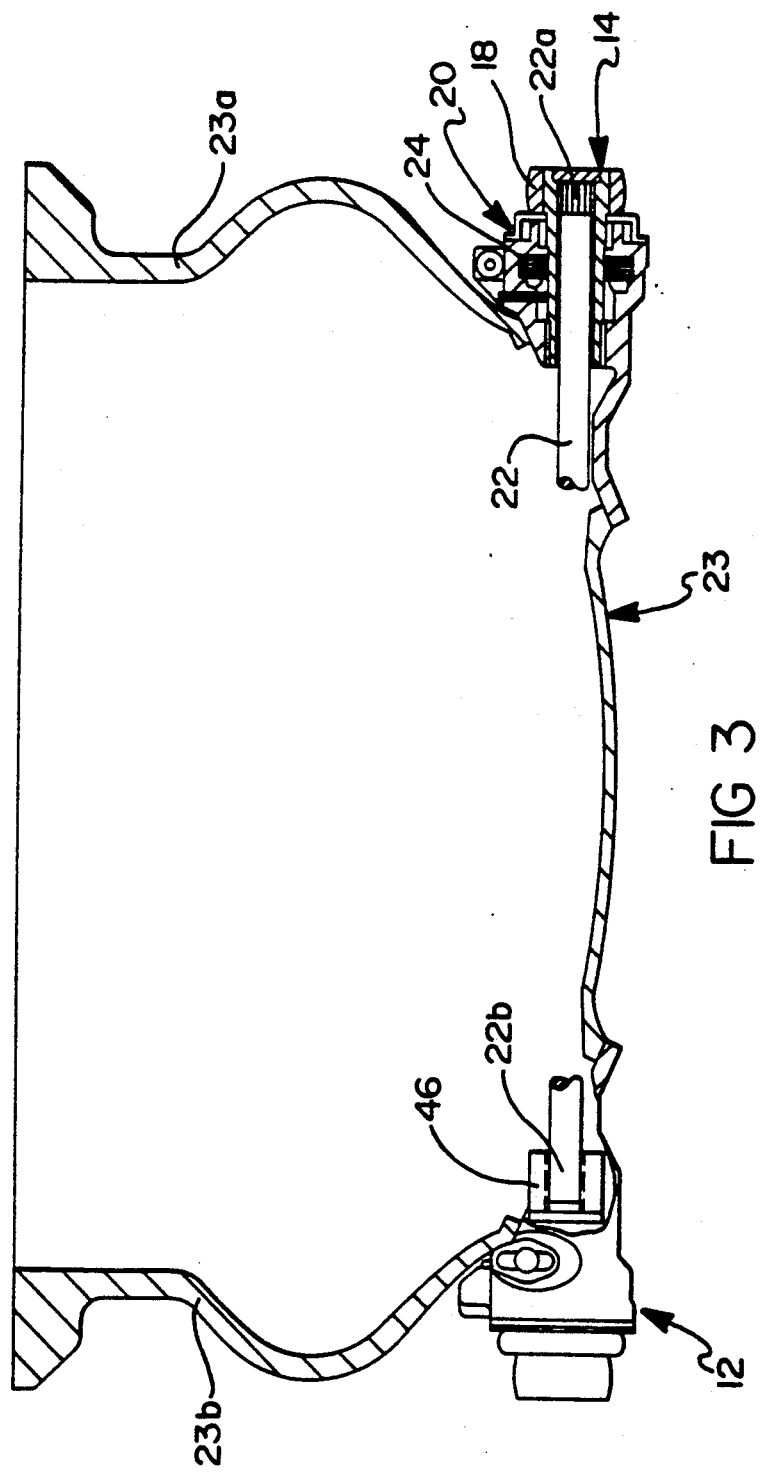

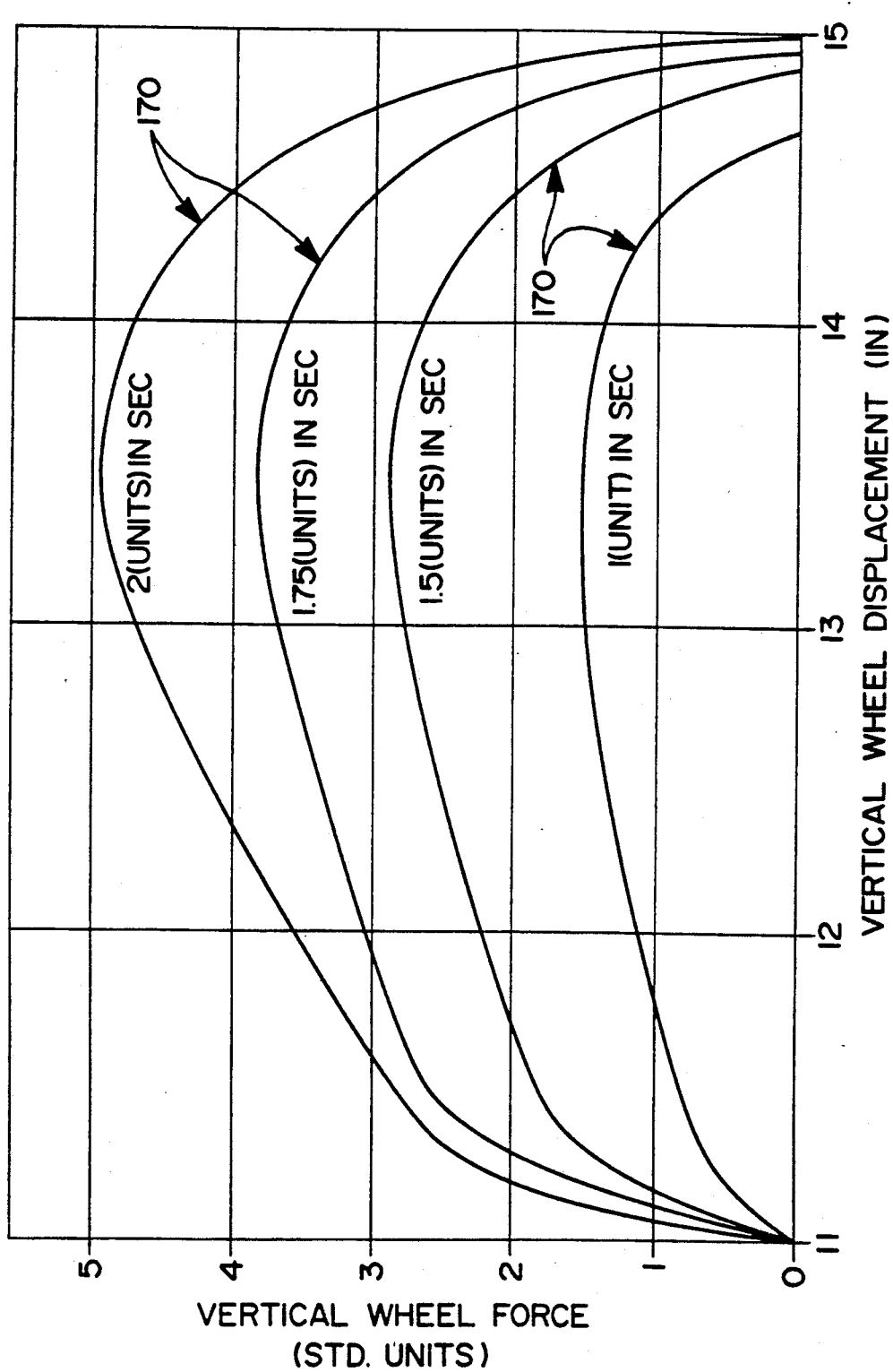

HYDROMECHANICAL CONTROL SYSTEM

FIELD OF THE INVENTION

This invention relates to vehicle suspension systems for wheeled or tracked off-road vehicle and, in particular, for heavy combat vehicles and, more particularly, to hydromechanical pressure control systems for controlling the pressurization of an actuator for controlling the damping action of a friction damper interposed between a vehicle hull and a road arm component of the vehicle suspension so as to improve the ride quality, handling characteristics, and energy consumption of said vehicles.

BACKGROUND OF THE INVENTION

U.S. Pat. No. 4,447,073 discloses a passive vehicle suspension system in which a multiple disk friction damper is associated with a hydraulic actuator, which is selectively pressurized by a hydromechanical pressure control system in accordance with the velocity of a road arm and road wheel having an in-arm hydropneumatic spring for supporting the vehicle hull.

The passive road wheel suspension of the '703 patent is useful in association with many off road vehicle operations and, while suitable for its intended purpose, is characterized by providing damping action which is correlated to a static position in which the vehicle hull and road arm have a predetermined relationship. Consequently, there are phases of operation in which the passive road wheel suspension may not provide full damping during extreme jounce and rebound movements of the road arm with respect to the vehicle hull.

Combat vehicles are, at the present time, equipped with such passive suspension systems. These systems consist of either mechanical or hydropneumatic springs in combination with fluid or friction dampers. Numerous concepts for semi-active and active suspension systems whose objects are to improve the ride and the stability of road and rail vehicles have been disclosed in U.S. Pat. Nos. 3,374,005 and 4,194,761. The design of these systems is a compromise between the conflicting requirements for a stiff, heavily damped suspension system to lift the vehicle over terrain disturbances whose amplitude is greater than the available wheel travel and to statically equilibrate and dynamically stabilize the vehicle; and a soft, lightly damped system to isolate the vehicle from terrain disturbances whose amplitude is within the available wheel travel. This compromise, which is generally resolved in favor of permitting the vehicle to traverse rough terrain without bottoming the suspension system, results in a combat vehicle wherein the crew and the equipment's ride quality, the weapon platform's stability, the loss of vehicle contact with the ground, and the amount of energy absorbed combine to limit the mobility, agility, survivability and lethality of the combat system as it travels cross-country. In addition, these compromise suspension systems cause a high force spectral density to be transmitted between the ground and the vehicle so as to reduce the life of track, wheels, and bearings; and the resultant shock and vibration increase the maintenance requirements for the sights, sensors, electronics, etc. Either the size, weight, cost, complexity, energy consumption, reliability, maintainability, durability, or survivability of these systems, when applied to heavy combat vehicles, has precluded their acceptance and adoption. Thus, the interest in and the desire to achieve the potential advantages for combat vehicles with improved suspension systems has been thwarted by the limitations of these suspension systems.

SUMMARY OF THE INVENTION

Accordingly, it an object of the present invention to provide a cost and combat effective semi-active suspension system applicable to heavy combat vehicles operating off-road to control the damping forces acting between the vehicle hull and the road wheel and thereby the absolute motion of the vehicle hull and the relative motion of the road wheel to the vehicle hull; and to do so by use of an active friction damping system in combination with a hydraulic snubber and a mechanical spring to improve the ride quality, handling characteristics, and energy consumption of said vehicle.

A feature of the present invention is a dual pump/cam arrangement in combination with an orifice and a pressure relief valve to provide a passive hydromechanical damper pressure control system to control the torque output of the friction damper as a function of the jounce or rebound velocity of the road wheel relative to the vehicle hull, and independent of the position of the road wheel relative to the hull.

Another feature of the present invention is an active electrohydraulic damper control system to override the passive hydromechanical damper control system to control the torque output of the friction damper as a function of sensed operating conditions at low frequencies of relative motion between the road wheel and the vehicle hull provide a heavily damped suspension system for improved handling characteristics, and to do so at higher frequencies of relative motion between the road wheel hull and of absolute motion of the hull provide a lightly damped suspension system when the damping torque acts to attenuate the motion of vehicle wherein the crossover between these low frequencies and higher frequencies will be a function of the vehicle speed.

In another aspect, the present invention includes an improved hydromechanical control system for an in-spindle rotary friction damper which is operable to produce damping of both rebound and jounce movements of a road arm immediately upon movement of the road wheel with respect to the vehicle hull independently of the relative position of the vehicle hull and the road arm.

In one arrangement of the invention, a dual cam and dual pump assembly is located in an in-spindle location and includes cams which will operate pumps to produce a velocity responsive pressurization of a hydraulic actuator immediately upon terrain induced movements of the road arm. The cams are configured to operate one or the other of a jounce pump or a rebound pump to direct pressure fluid to reversely arranged inlet and outlet check valves such that the hydraulic actuator will be pressurized during all movements of the road arm to bias a multiple disk friction damper so as to absorb and dissipate energy as the vehicle hull moves on its spring suspension independently of the relative position of the vehicle hull and the road arm.

Another feature of the present invention is a hydraulic snubber to develop a force which resists the motion of the road arm relative to the vehicle hull in the jounce direction of road wheel motion as a function of both the velocity and the position of the road arm relative to the vehicle hull to lift the vehicle over large terrain disturbances which exceed the available road wheel travel.

It is a further object of the present invention to provide a semi-active suspension system which, in the event of failure of the active electrohydraulic damper control system or at the driver's command, reverts to the hydromechanical mode of operation.

It is a further object of the present invention to provide a semi-active suspension system wherein the arrangement of the structure of the active damping control system, and the hydraulic snubber enable the mechanical spring to be a torsion bar extending across the width of the vehicle and thereby providing high load capacity and high road wheel travel.

It is another feature of the present invention that the torsion bar may be fabricated from a material having higher strength, toughness, and endurance in combination with a lower shear modulus of elasticity relative to typical carbon steels previously used for this purpose to maximize both the load capacity and the road wheel travel.

Another feature of the present invention is to provide a such a hydromechanical control system wherein a orifice is included between the actuator and a crankcase, the orifice being operative to convert the pump flow to a control pressure dependent upon the flow rate of the pumps which is in turn dependent upon the relative velocity of the road arm and the vehicle hull and wherein the control pressure determines the level of the damping action and energy absorption from the vehicle hull.

Still another feature of the present invention is to provide a relief valve in association with the orifice to relieve the system pressure back to the crankcase when an excessive bias is imposed on the multiple disk friction damper due to extremely violent movements induced in the road arm because of very rough terrain.

A further object of the present invention is to provide an electrohydraulic pressure control system as set-forth further including an active damping controller which will respond to signals from hull motion and road arm motion sensors so as to generate a control signal for conditioning a solenoid controlled relief valve for overriding the passive control system during predetermined limits of road wheel travel.

Still another object of the present invention is to provide cam configurations for operating the rebound and jounce pumps which have a shape that will enable the same cam component to be used on road arms on either the right or left side of a vehicle so as to reduce the number of parts in the vehicle suspension system.

Yet another object of the present invention is to provide rebound and jounce pumps that have spring loaded pistons that are operable either in a left side mounted road arm or in a right mounted road arm so as to further reduce the number of parts in the vehicle suspension system.

A still further object of the present invention is to provide the electrohydraulic pressure control system of the preceding paragraph wherein the vehicle has a mechanical spring system preloaded to have a vertical force for supporting the vehicle, an active friction damping system connected in parallel with the mechanical spring to develop a force to resist the motion of the road wheel relative to the vehicle hull, and a hydraulic bump stop or snubber connected in parallel with the mechanical spring to develop a force for resisting road wheel movement in the jounce direction; an active damping controller is operative to produce first and second levels of damping the lowest of which is established to enable the spring support for the vehicle to act to absorb or swallow road arm movements as the road arm is forced by rough terrain toward the hull and wherein further undamped movement of the road arm is absorbed by the hydraulic bump stop which is arranged to intercept the road arm and cause the undamped road arm to lift the vehicle over the terrain bumps and wherein on reverse road arm movement, the higher damping level is selected such that the road arm and road wheel will engage the terrain and damp vehicle movement toward the terrain in conjunction with the spring action of the suspension system and in conjunction with energy absorption produced by engagement of the hydraulic bump stop and the road arm following full compression or windup of the spring; full energy absorption by the damper and full engagement of the hydraulic bump stop with the road arm.

A still further object of the present invention is to provide such hydromechanical control systems in a vehicle suspension system in which the vehicle spring is a spring appropriately configured for a particular vehicle configuration.

Yet another object of the present invention is to provide such hydromechanical control systems in a vehicle suspension system in which the vehicle spring is a hydropnuematic in-arm spring of the type shown in U.S. Pat. No. 4,447,073 the disclosure of which is herein incorporated by reference.

Still another object is to provide such a hydromechanical control system in a vehicle suspension system in which the spring component is a torsion bar.

These and other objects, features and advantages of the invention will be more apparent when taken in conjunction with the following detailed description in view of the drawings in which:

BRIEF DESCRIPTION OF THE DRAWINGS

FIG. 3 is a sectional view taken through a right hand torsion bar of the vehicle in FIG. 1;

FIG. 11 is a chart showing the energy absorption characteristics of the hydraulic bump stop used in the invention.

DETAILED DESCRIPTION OF PREFERRED EMBODIMENTS OF THE INVENTION

Figure 2:
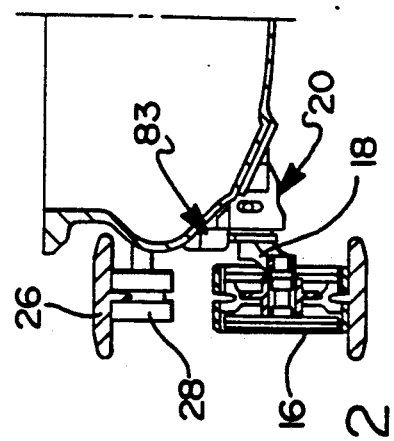
FIG. 2 is a fragmentary sectional view taken along the line 2—2 of FIG. 1 looking in the direction of the arrows.
Figure 1:
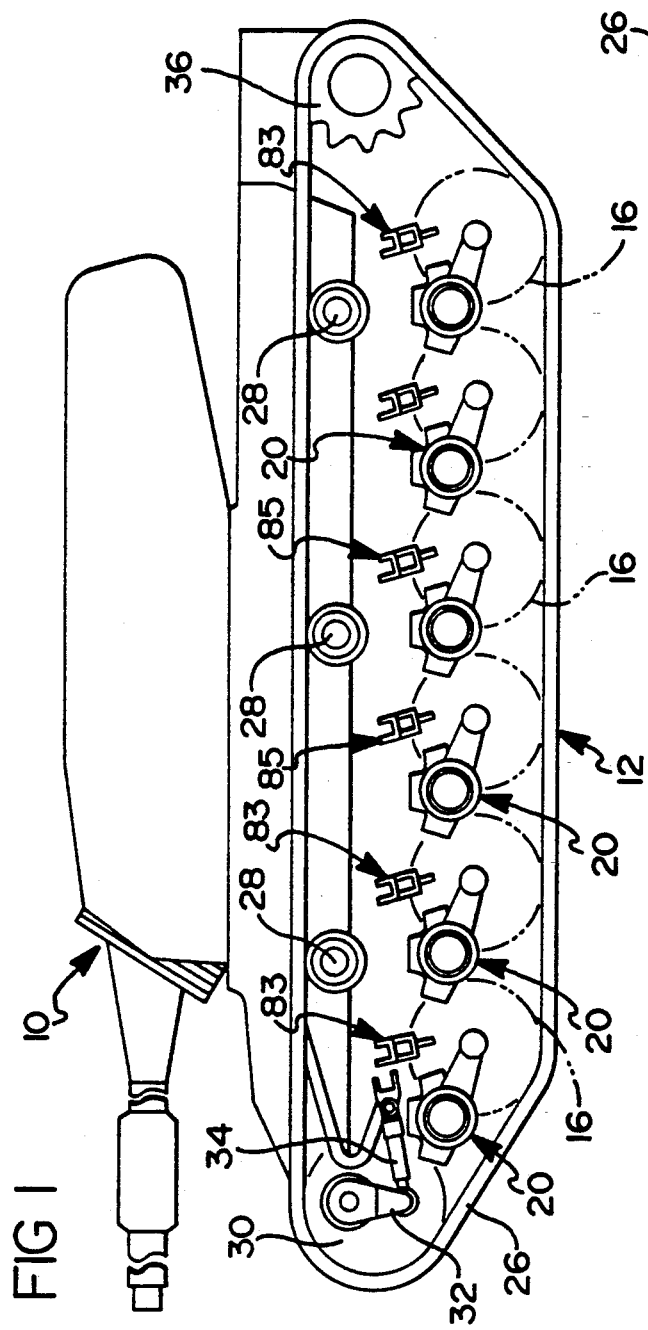
FIG. 1 is a side elevational view of a tracked vehicle with a hydromechanical control system of the present invention.

Referring now to FIG. 1, an armored vehicle 10 is illustrated including a right hand and a left hand track laying system 12, 14. Each of the track laying systems 12, 14 include a plurality of road wheels 16 each carried on the end of a pivotable road arm 18 in a suspension assembly 20.

Each of the suspension assemblies 20 includes a spring 22 for supporting a vehicle hull 23 and further includes a multiple disc friction damper 24 for absorbing energy of motion of the hull on the spring support as the road wheels 16 encounter bumps and obstacles in the terrain which it traverses.

More particularly, the track laying systems 12, 14 each have a track 26 which is guided over a plurality of spaced support rollers 28 located at spaced points on the hull 23 at the right and left sides thereof at a point overlying the suspension assemblies 20. The front end of each of the tracks 26 contacts an idler wheel 30 having an idler arm 32 to which a track tensioner 34 is fastened for tensioning the tracks 26 across the road wheels 16 and an aft mounted drive sprocket 36.

Figure 4:
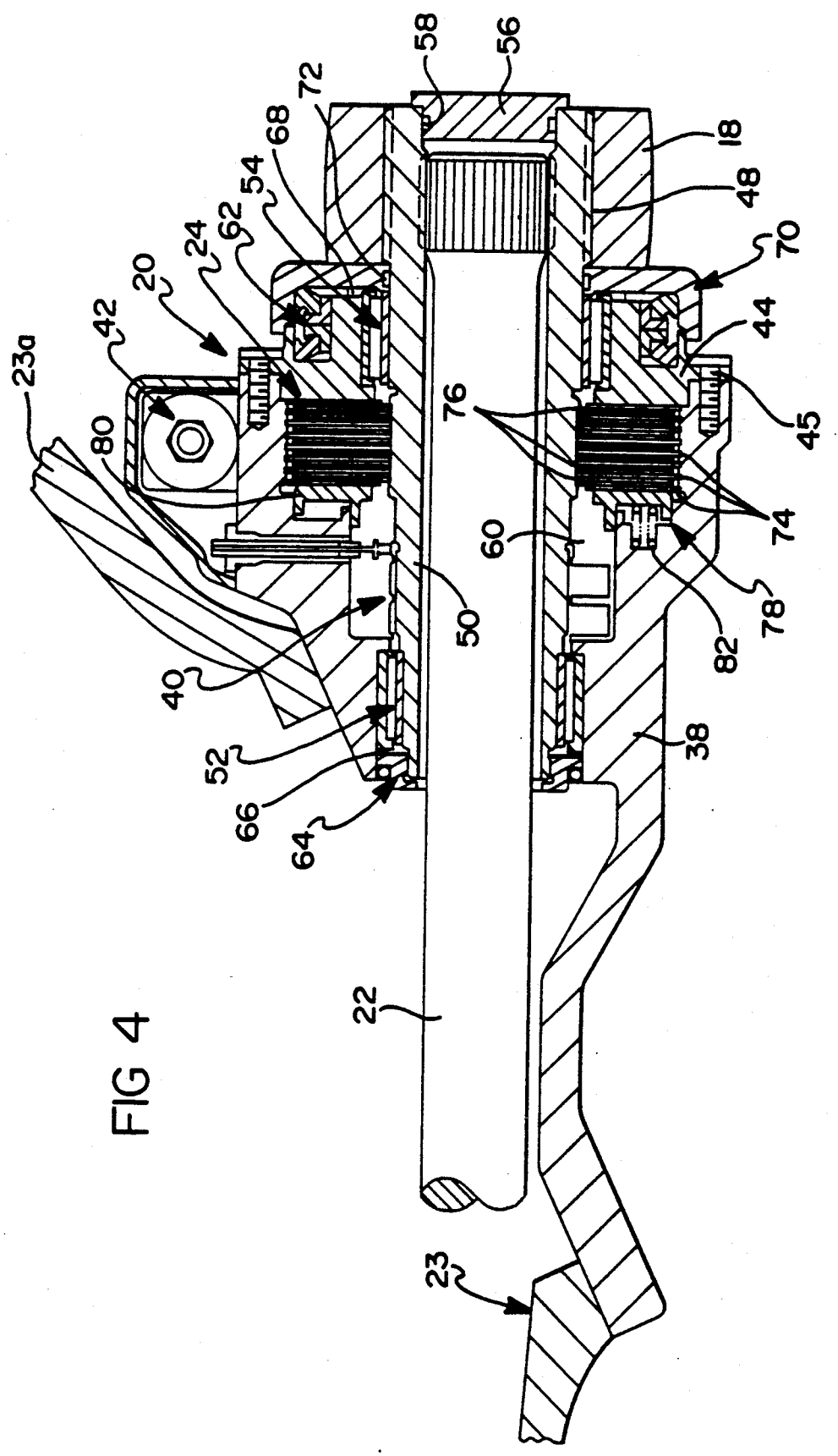
FIG. 4 is an enlarged fragmentary view partially in elevation and partially sectioned of a right hand suspension assembly in the vehicle of FIG. 1.

Each of the suspension assemblies 20 includes a housing 38 secured by suitable fasteners to the vehicle hull 23 at the right and left sides 23a and 23b thereof as best seen in FIGS. 3 and 4. The housing 38 includes a cover 44 secured to the front of the housing 38 by suitable fasteners 45. A control system 40 is contained within housing 38.

As best seen in FIG. 3, each of the suspension assemblies 20 is connected to the outboard end 22a of a torsion bar spring 22 having the inboard end 22b thereof connected to a torsion bar anchor 46. More particularly, the outboard end 22a is connected by a spline joint 48 to a road arm spindle 50 supported in turn within the housing 38 by a pair of spaced roller bearing assemblies 52, 54. The road arm spindle 50 is connected to the end of the road arm 18 and a end cap 56 fits in the outboard end of the spindle 50 to cover an access hole 58 to the torsion bar spring 22. The housing 38 and spindle 50 define a crankcase 60 that is filled with oil. The crankcase 60 is sealed at one end by a front crankcase seal 62 and at the opposite end by a rear crankcase seal 64. A rear thrust washer 66 is disposed between the roller bearing 52 and the seal assembly 64 and a front thrust washer 68 is located between the front crankcase seal assembly 62 and a front crankcase seal retainer 70 that is secured to the front end of the suspension assembly 20. A static crankcase seal 72 is provided between the seal retainer 70 and the spindle 50.

The multiple disc friction damper 24 more particularly includes eight stator discs 74 secured to the spindle housing 38 and seven rotor discs 76 are secured for rotation with the spindle 50. The damper 24 is a wet multiple disc brake of the type shown in U.S. Pat. No. 4,447,073. The rotor discs 76 rotate in response to movement of the road arms 18 as produced during travel of the vehicle 10 over bumps and obstacles in the terrain which it traverses. The discs 74, 76 are biased together under the control of the hydromechanical control system 40 of the present invention and in the case of the active suspension system embodiment of the invention a solenoid operated pressure relief valve 42. The control system controls the pressure on a hydraulic actuator 78 having a piston 80 engaging the inboardmost one of the discs 76. A preload spring 82 is interposed between the housing 38 and the piston 80 for maintaining a minimal force on the friction damper 24.

Each of the suspension assemblies 20 is associated with a hydraulic bump stop 83 and a mechanical bump stop 85 that will cooperate to produce an improved control of vehicle motion as will be discussed.

Figure 5:
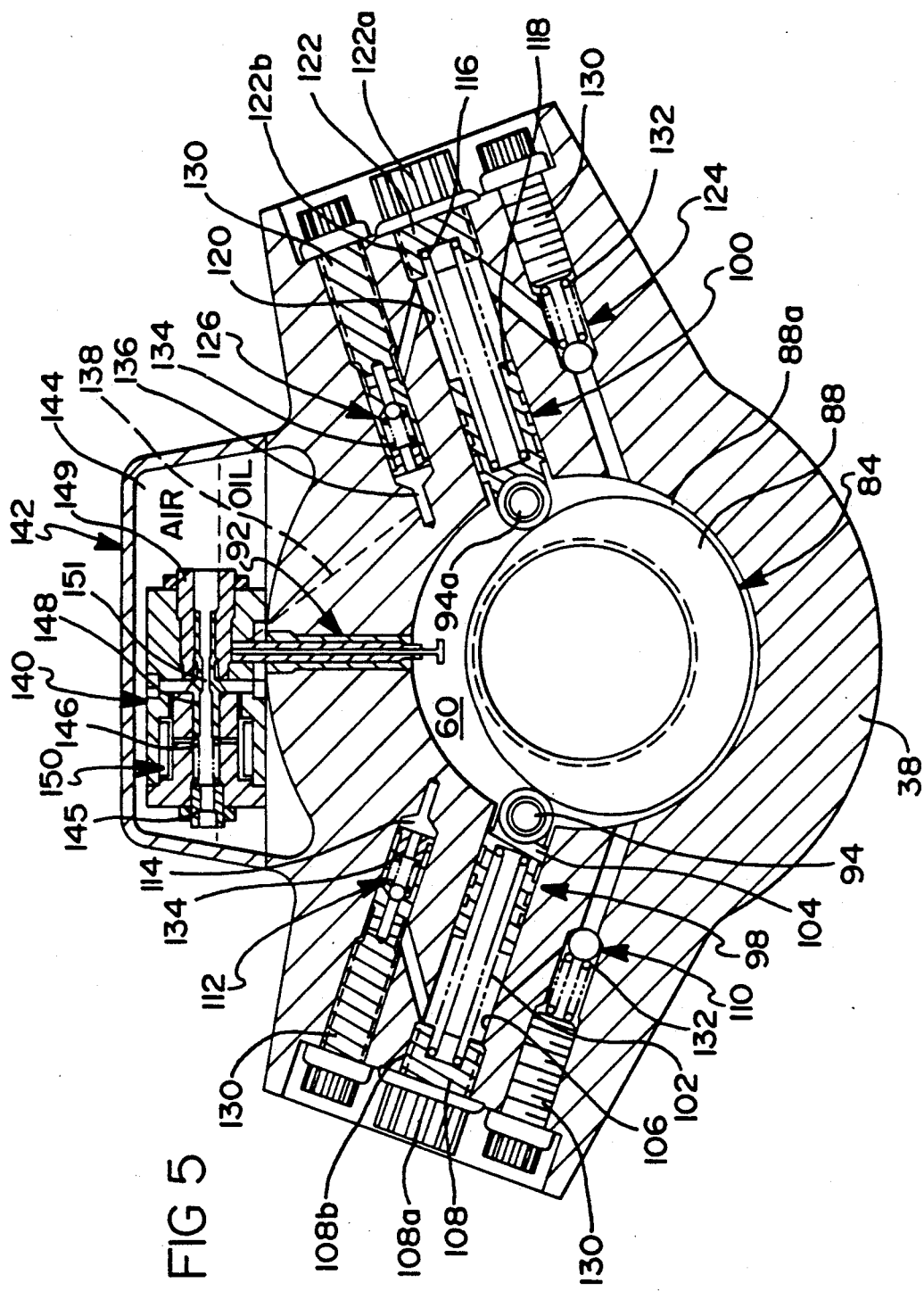
FIG. 5 is a sectional view taken along the line 5—5 of FIG. 4 looking in the direction of the arrows.

Referring now to FIG. 5, the hydromechanical control system 40 is shown as including a dual lobe cam 84 including first and second cam elements 86, 88 both associated with a third cam 90. The cam elements 86, 88 drive a rebound pump 98 and a jounce pump 100, respectively. The third cam 90 operates a velocity sensor 92 for producing an active suspension control system signal of the velocity of the hull 23 relative to the road arm 18. The cam 86 has a profile surface 86a which engages a cam follower 94 on the end of a rebound pump 98. The cam 88 has a profile surface 88a which engages a cam follower 94a on the end of jounce pump 100. In accordance with one feature of the invention each of the cams 86, 88 and pumps 98, 100 have a configuration which enables the same elements to be used on both the right and left side of the vehicle so as to reduce the number of components in the vehicle suspension.

The rebound pump 98 includes a spring 102 for loading a piston 104 to which the follower 94 is connected. The bore 106 for the piston 104 is closed by a cap 108 having a socket screw head 108a and a skirt 108b which is sealed with respect to the housing 38 for closing the bore 106. The piston 104 is reciprocated in the bore 106 during any rebound movement of the road arm 18 independent of the relative position of the road arm 18 with respect to the hull such that a rebound damping force will be imposed on the road arm 18 as will be described. An inlet check valve 110 is located in the housing 38 to communicate the crankcase 60 with the bore 106. An outlet check valve 112 in the housing 38 communicates the bore 106 with a passage 114 to the hydraulic actuator 78.

The jounce pump 100 includes a spring 116 for loading a piston 118 to which the follower 94a is connected. The bore 120 for the piston 118 is closed by a cap 122 having a socket screw head 122a and a skirt 122b which is sealed with respect to the housing 38 for closing the bore 120. The piston 118 is reciprocated in the bore 120 during any jounce movement of the road arm 18 independent of the relative position of the road arm 18 with respect to the hull such that a jounce damping force will be imposed on the road arm 18 as will be described. An inlet check valve 124 is located in the housing 38 to communicate the crankcase 60 with the bore 120. An outlet check valve 126 in the housing 38 communicates the bore 120 with a passage 128 to the hydraulic actuator 78. Each of the inlet and outlet check valves is closed at its outer end by a socket headed plug 130. Each of the inlet check valves includes a biasing spring 132 which holds a ball valve seated closed and each of the outlet check valves includes a biasing spring 134 holding a ball valve seated closed.

The outlet check valve 126 communicates with a passage 136 to the actuator 78. It in turn is communicated through a suitable path 138 to the inlet of a relief valve 140 which is located in a crankcase dome 142. The dome 142 is partially filled with oil as shown in FIG. 5 to provide an air chamber 144 for expansion of oil during operation of the hydromechanical control system 40. The relief valve 140 has a threadably adjustable sleeve 145 for setting relief valve pressure by varying the bias on a relief spring 146 holding a sleeve valve 149 in its closed position. The opposite end of the relief valve 140 includes a threadably adjusted sleeve 149 for controlling the solenoid gap adjustment for an active damping electromechanical actuator (solenoid) 150 which will open the relief valve under the control of an active damping control system to be described. An orifice 151 is provided to control the amount of pressure bias that will be maintained on the actuator 78 so as to control the jounce and rebound damping wherein the motion of the vehicle and the resultant energy will be absorbed and dissipated by the hydromechanical control of the present invention.

The hydraulic actuator 78 clamps the friction brake with a force proportional to the actuator pressure. A passive hydromechanical pressure control system develops an actuator pressure as a function of both road arm position relative to the hull and road arm velocity relative to the hull in both the jounce and rebound directions of motion over the full range of road arm travel. The actuator pressure through the hydraulic actuator and brake assembly produces a torque which resists road arm rotation. An active electrohydraulic pressure control system modifies the roam arm velocity/pressure characteristics of the hydromechanical pressure control system as a function of sensed operating conditions to reduce the damping torque to a low level whenever the torque is in such a direction as to accentuate the absolute motion of the hull.

Figure 6:
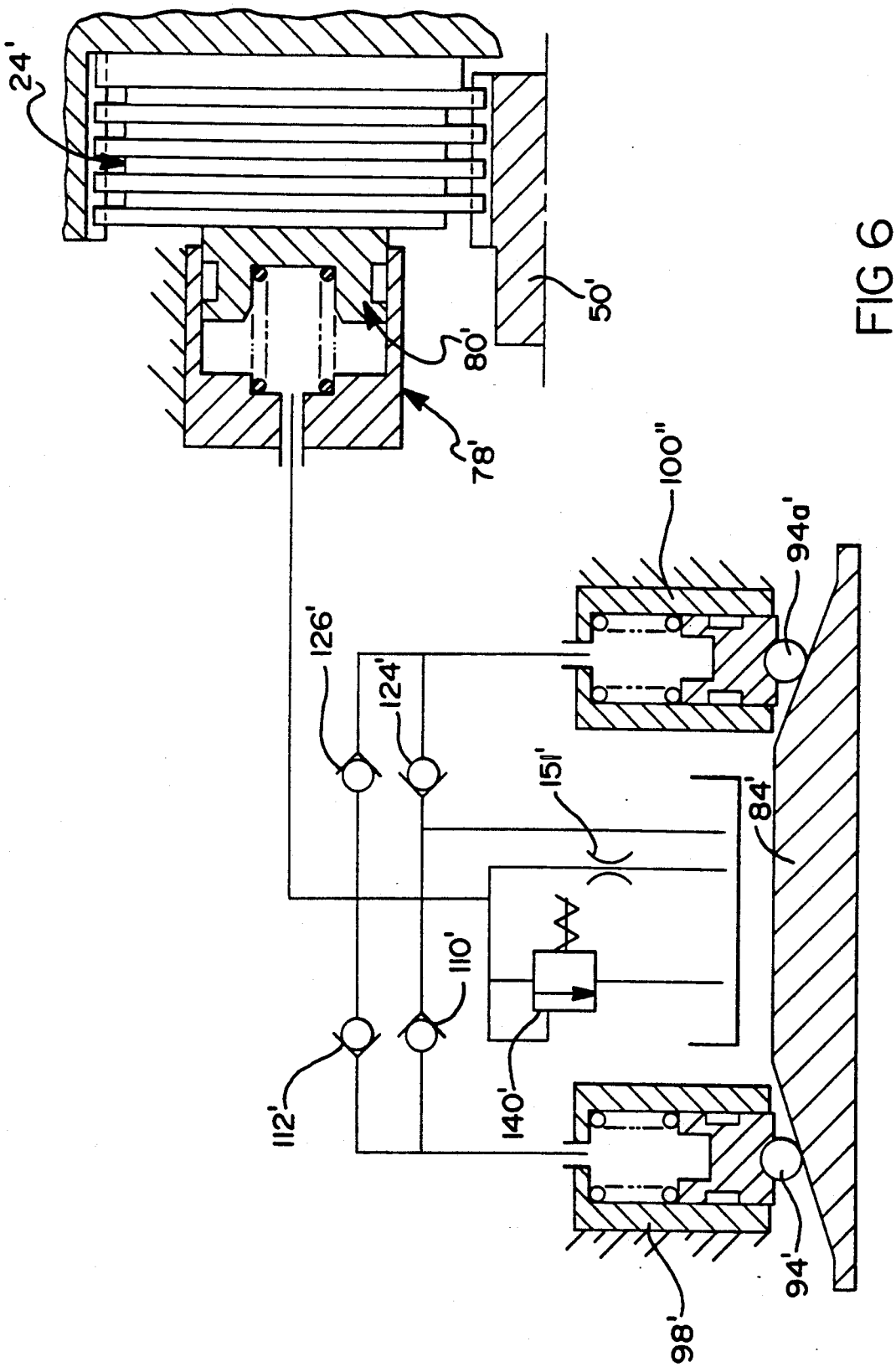
FIG. 6 a schematic view of a hydromechanical control for damping a passive suspension assembly.

Referring to FIG. 6, a passive suspension system embodiment of the invention is illustrated in which like components to those shown in the embodiment of FIGS. 1-5 are designated with primed reference numerals. In the FIG. 6 embodiment a dual lobe cam 84' is shown. Each lobe of the cam drives a spring loaded pump piston 98', 100' by means of a cam follower 94', 94a'. A pair of check valves 124', 126' are arranged so that when a road arm is rotated it will drive a spindle 50' in response to jounce direction movement such that fluid will be displaced by the pump 100' through the valve 126' to the hydraulic actuator 78'. Rotation of the road arm in a rebound direction will cause the pump 98' to displace fluid through the valve 112' to the actuator 78'. The pumped fluid will produce a pressure in accordance with the velocity of the road arm which will vary in accordance with a size of the orifice 151'. In this embodiment the maximum available damping action is controlled by a relief valve 140' which will dump the pumped fluid back to the system reservoir when too great a pressure builds up in the system which would otherwise damage the damper 24'.

Figure 7:
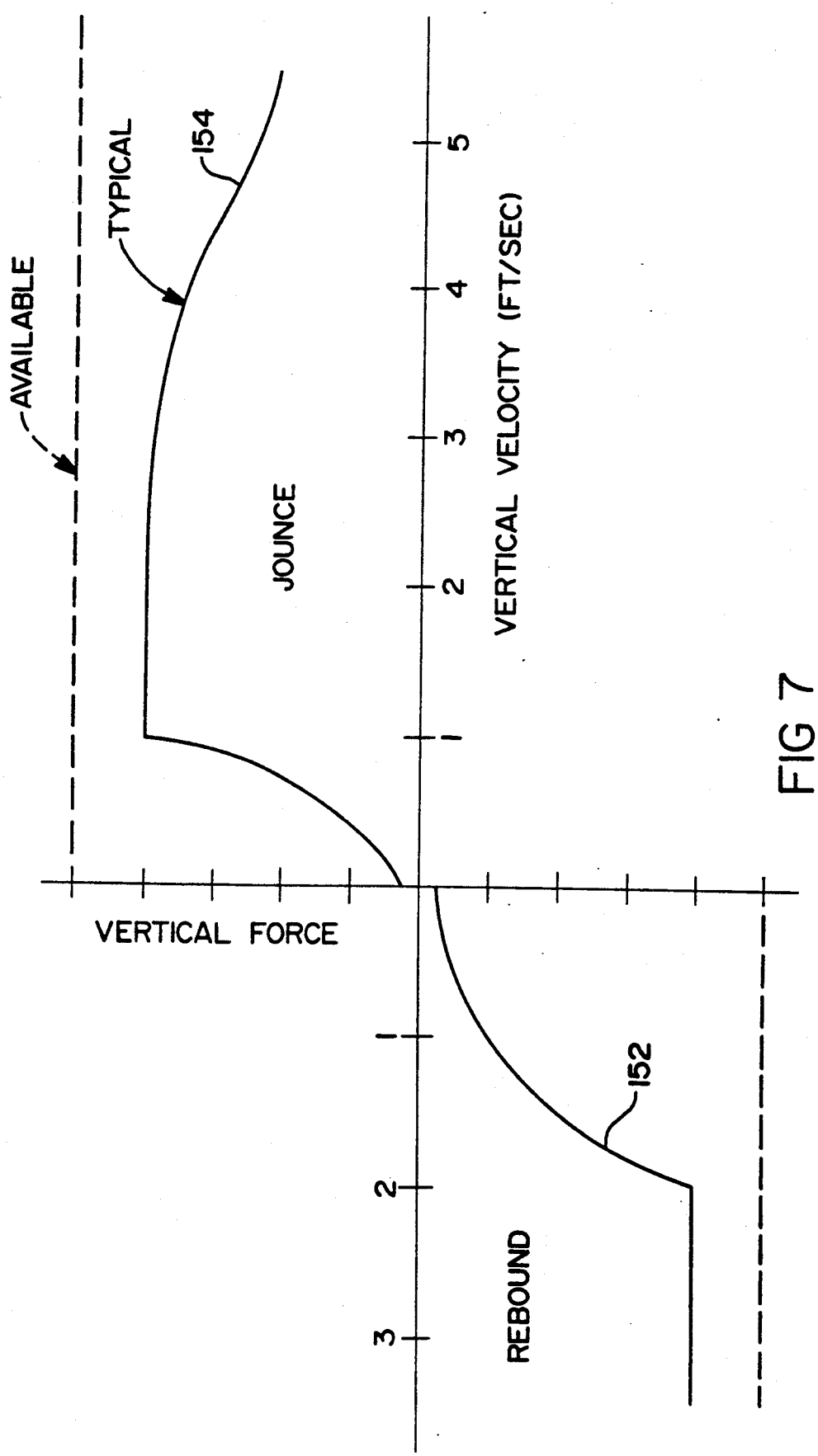
FIG. 7 is a chart showing the damper characteristics of the hydromechanical control of FIG. 6.

The hydromechanical damper characteristics of the embodiment shown in FIG. 6 are shown in FIG. 7 in which curves 152 and 154 show the rates of change of damping established by the orifice 151' at various road arm velocities during both rebound and jounce directions of motion.

Figure 8:
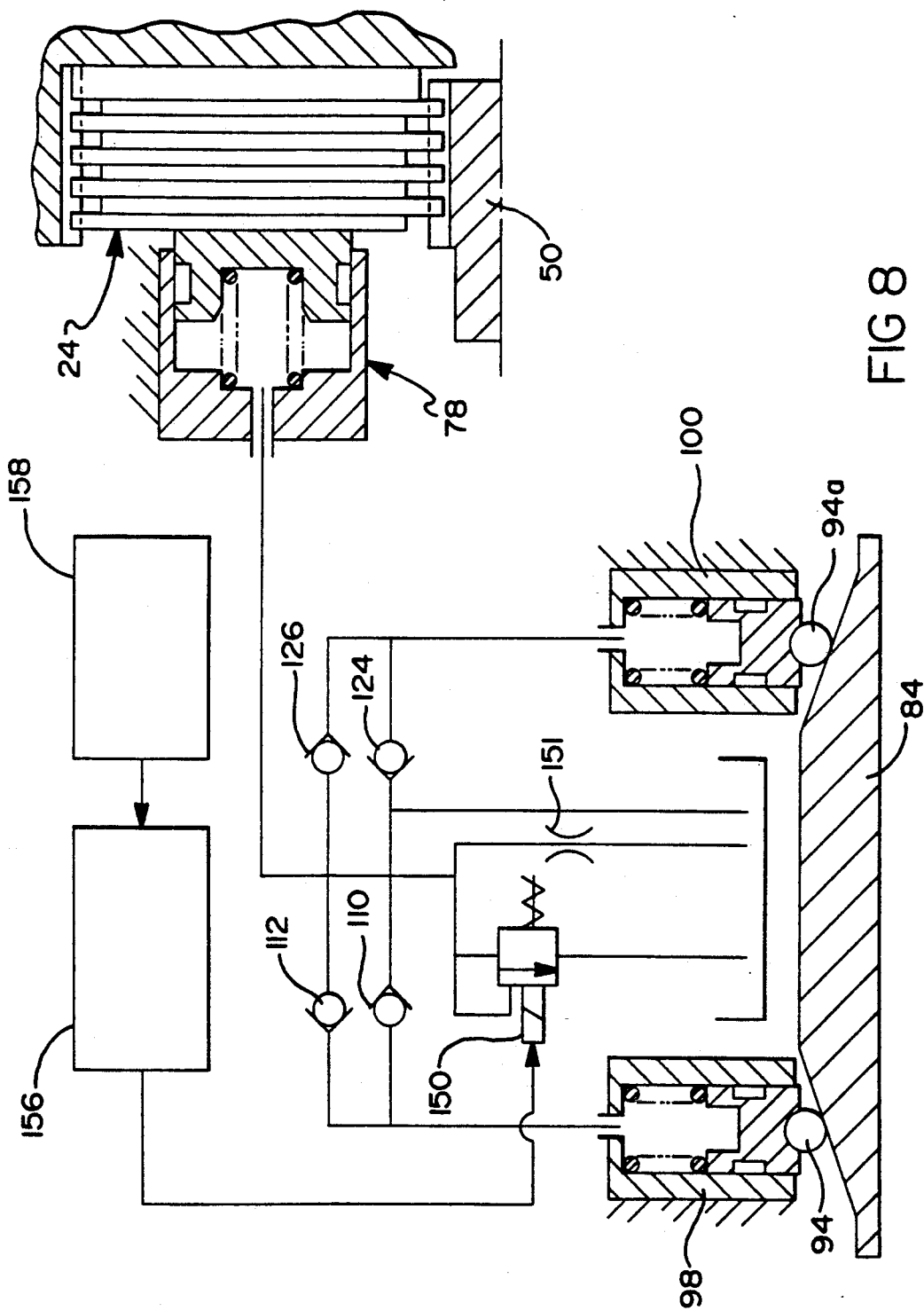
FIG. 8 is a schematic representation of a hydromechanical control for damping an active suspension assembly.
Figure 10:
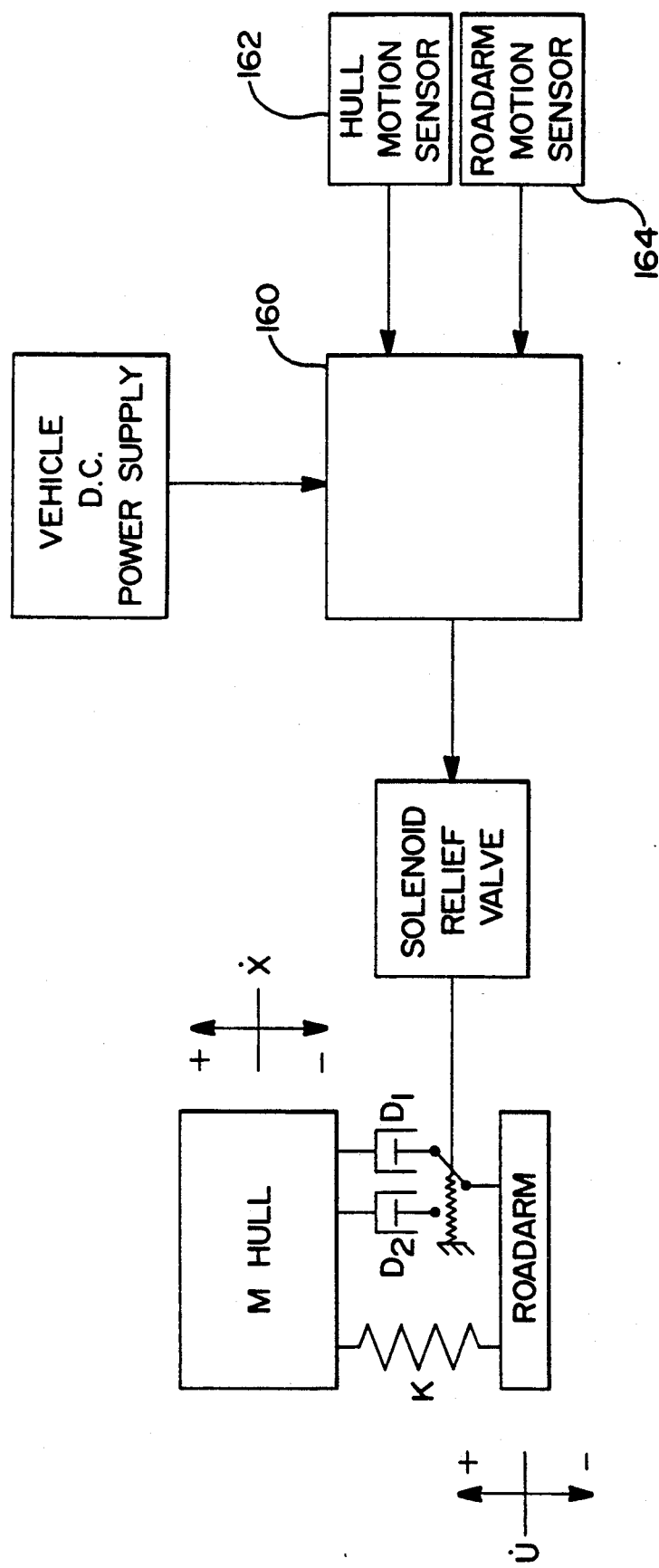
FIG. 10 is a schematic representation of a model of the active damping controller used in the hydromechanical control of FIG. 8.

A schematic diagram of the embodiment of FIGS. 1-5 is shown in FIG. 8 which includes like reference numerals for like components. In this embodiment the solenoid 150 is energized by a signal from an active damping control system 156 which in turn is powered by the D.C. power supply 158 of the vehicle. As shown in FIG. 10 the solenoid 150 receives an signal from a active damping controller 160 which is programmed with logic which will reduce the damping to that of the biasing spring preload of spring 84 during periods when it is desirable to swallow terrain induced movements of the road wheel in a direction toward the vehicle hull. Under such circumstances, a hull motion sensor 162 and a road arm motion sensor 164 will produce signals inputted to the controller 160 to produce the following operating mode.

According to the present invention, a semi-active suspension system for an off-road vehicle comprises, in combination, a mechanical spring system 22 preloaded to develop a vertical force to support the vehicle hull 23 relative to a road wheel 16, an active friction damper 24 connected in parallel with the mechanical spring 22 to develop a force which resists the motion of the road wheel 16 relative to the vehicle hull 23 in both the rebound direction and in the jounce direction. A hydraulic snubber 83 is connected in parallel with the mechanical spring 22 to develop a force which resists the motion of the road wheel relative to the vehicle hull in the jounce direction of road wheel motion.

The hydromechanical control system 20 and an electrohydraulic control system 150, in response to the spindle housing motion, controls the damper 24 to absorb and dissipate energy to the surrounding atmosphere. The hydraulic fluid in the crankcase 60 also acts as the reservoir for the damper control system. The damper control system 40 is a fail safe system which reverts to the passive hydromechanical mode of operation should the active electrohydraulic mode of operation fail or be turned off.

The self-contained hydraulic snubber 83 is fixedly secured to the side of the vehicle hull 23, and it will develop a force which resists the motion of the road wheel 23 relative to the vehicle in the jounce direction of road wheel motion as a function of the relative velocity of the road wheel to the vehicle hull and the position of the road arm relative to the vehicle. It will develop this force through the final portion of the jounce motion of the road wheel. The snubber 83 is an energy absorber. It provides essentially square wave energy absorption, and thereby a linear reduction of the impact energy over its entire compression travel. This linear reduction results in a maximum energy absorption with a minimum force exerted between the road wheel and the vehicle hull. The absorbed energy is converted to heat and, thus, is not restored to either the rebounding unsprung mass of the road wheel or to the jouncing sprung mass of the vehicle hull.

The active damper reduces the damping torque to a low level whenever the torque is in such a direction as to increase the absolute motion of the hull. This enables the suspension system to better swallow terrain disturbances whose amplitudes are within the available road wheel travel. The hydraulic snubber acts to both lift the vehicle to clear those terrain disturbances whose amplitude is greater than the available wheel travel, and to catch the vehicle within the available wheel travel when the vehicle lands after being airborne as a result of traversing large terrain disturbances.

In combination, the active damper, hydraulic snubber, and the high capacity long wheel travel torsion bar will provide a combat vehicle with improved handling and ride characteristics over the total range of terrain roughness encountered when traveling cross country. In addition, less fuel will be consumed and there will be less wear and tear on propulsion and running gear systems and on sensitive equipment in the vehicle. Thus, this combination will provide a payoff in increased combat effectiveness and a payback in reduced operating and service costs.

Figure 9:
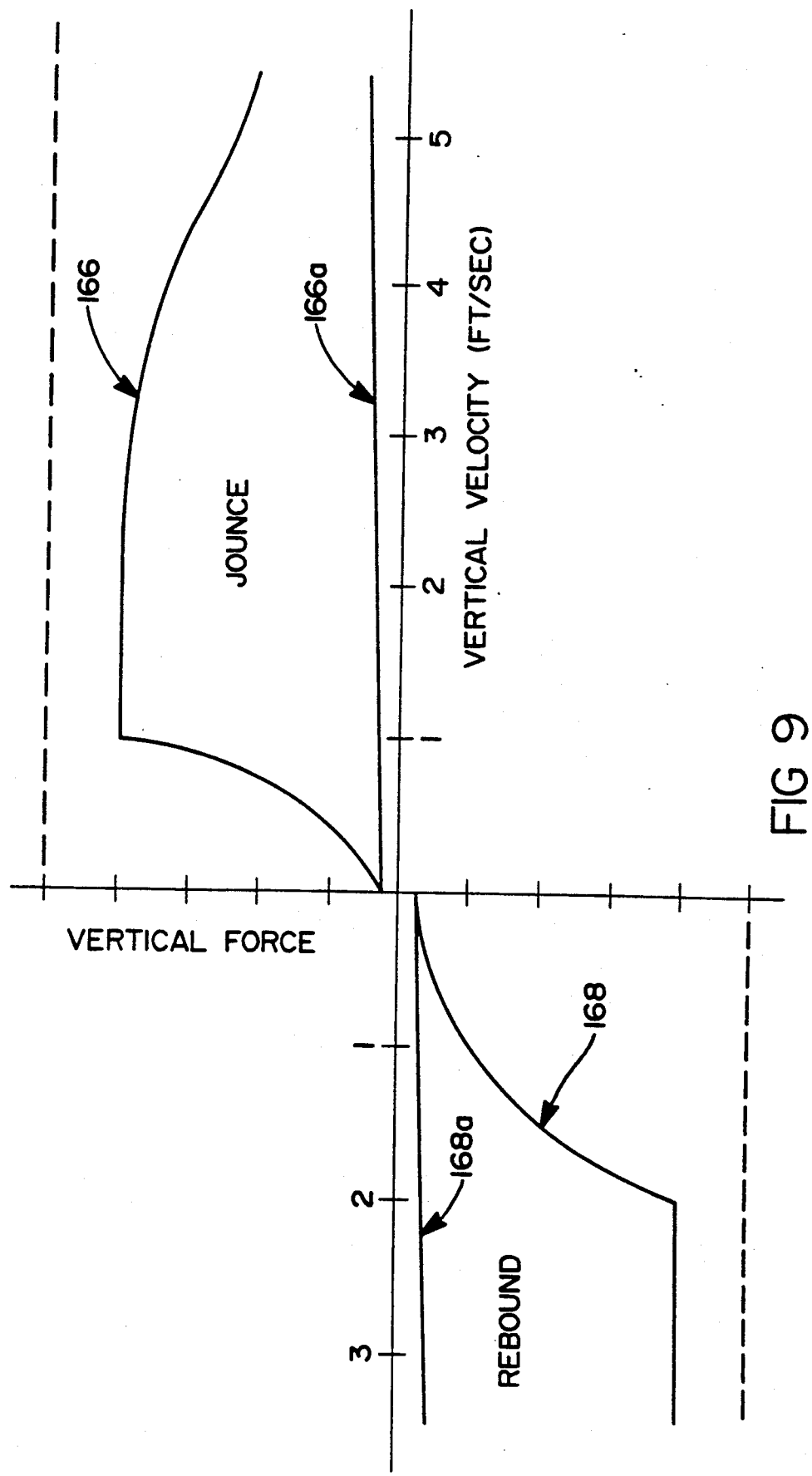
FIG. 9 is a chart showing the damper characteristics of the hydromechanical control of FIG. 8.

The damping characteristics of the damping control system 156 are shown in FIG. 9 as including jounce and rebound curves 166 and 168 and two reduced damping characteristics shown by curves 166a and 168a in which the only damping is attributable to the action of the preload spring 72 which is the only damping when the solenoid relief valve is opened during the swallowing mode of operation.

The damping characteristics of the hydraulic snubber 83 are shown by curves 170 in FIG. 11 at various road arm velocities.

The properties of the torsion bar 22 are as follows:

| Property | High Strength 4340 Alloy Steel | 18% Nickel Maraging Steel |
|---|---|---|
| Ultimate Tensile PSI | 285 000 | 294 000 |
| 0.2% yield strength PSI | 240 000 | 287 000 |
| Hardness, Rc | 55 | 59 |
| Reduction Area, % | 9.0 | 10.3 |
| Elongation % | 33.9 | 44.6 |
| Impact Strength Ft-Lb Charpy V-notch | 15.0 | 17.5 |
| Rotating Beam Fatigue Strength, PSI $10^5$ cycles | 110 000 | 145 000 ($10^6$ at 130 000) |
| Modulus Shear, PSI | $11.5 \times 10_6$ | $10.5 \times 10_6$ |
| Max. allowable shear stress, PSI ($5 \times 10^4$ cycles rebound to jounce) | 180 000 | (189 000) min. est. |

While the embodiments of the invention set forth herein are preferred embodiments it should be recognized that the hydromechanical control systems are equally suitable for use with in arm hydropneumatic springs or for use in hull mounted hydropneumatic springs which will take the place of the illustrated torsion bar springs. The hydromechanical control systems are rugged, easily assembled systems which are readily adaptable to known off road vehicles utilizing torsion bar suspensions. While the embodiments are preferred forms, it is to be understood that other forms might be adopted and that the scope of the invention is that set forth in the following claims.

What is claimed is:

1. A hydromechanical control system for a vehicle suspension system for supporting a hull with respect to ground engaging road wheels connected to road arms moveable with respect to the hull comprising:

spring means for resiliently supporting said hull on said road arms;

friction damping means including friction discs for absorbing energy to attenuate terrain induced motion of said hull and road arms; and control means including a hydraulic actuator for operating said friction damping means by varying the pressure on said friction discs to damp both jounce and rebound movements of said road arms relative to said hull independently of the static position of said hull and said road arms relative to one another.

2. The hydromechanical control system of claim 1 further characterized by said control means including dual cam elements and jounce and rebound pump means driven by said dual cam elements to produce a flow of pressure fluid; a reservoir and orifice means; hydraulic actuator means for receiving the flow of pressure fluid and pairs of inlet and outlet check valves for controlling flow of fluid to and from said reservoir and said orifice means for establishing the flow of fluid back to said reservoir so as to vary the friction damping rate in accordance with the velocity of said road arms.

3. The hydromechanical control system of claim 2 further characterized by a spindle and a spindle housing; said jounce and rebound pump means including a jounce pump and a rebound pump; said dual cam elements located within said spindle housing and said spindle operating said dual cam elements to produce a velocity responsive pressurization of said hydraulic actuator means immediately upon terrain induced movements of the road arm; said pairs of inlet and outlet check valves being reversely arranged and said dual cam elements having a surface profile configured to operate said jounce pump or said rebound pump to direct pressure fluid to said reversely arranged pairs of inlet and outlet check valves such that said hydraulic actuator means will be pressurized during al movements of the road arm.

4. The hydromechanical control system of claim 3 further characterized by said friction damping means including multiple disk friction dampers for absorbing and dissipating energy as the vehicle hull moves on its spring suspension independently of the relative position of the vehicle hull and the road arm.

5. The hydromechanical control system of claim 1 further characterized by a crankcase having hydraulic fluid therein; a hydraulic actuator for operating said friction damping means and an orifice between said hydraulic actuator and said crankcase; a jounce pump and a rebound pump for supplying hydraulic fluid to said hydraulic actuator and said crankcase; said orifice being operative to convert the pump flow to a control pressure dependent upon the flow rate of said pumps which is in turn dependent upon the relative velocity of the road arm and the vehicle hull and wherein the control pressure determines the level of the damping action of said friction damping means and energy absorption from the vehicle hull.

6. The hydromechanical control system of claim 1 further characterized by an electrohydraulic controller including means for actively overriding said control means by depressurizing said hydraulic actuator to partially unload said friction damping means to permit said friction damping means to swallow movement of said road arms toward said vehicle hull when said road wheels encounter a terrain bump of a predetermined magnitude.

7. The hydromechanical control system of claim 6 further characterized by a bump stop means on said hull operative following overriding of said control means by engagement with said road arms during undamped jounce movement thereof for providing an additional lift to the vehicle hull for lifting it over the terrain bump and for providing additional energy absorption when the vehicle returns its road wheels into ground engagement with the terrain.

8. The hydromechanical control system of claim 6 with vehicle speed controlled switch means to adjust said control means to terrain conditions.

9. The hydromechanical control system of claim 1 further characterized by said spring means being a spring matched to the vehicle type.

10. The hydromechanical control system of claim 1 further characterized by said spring being a torsion bar having one end connected to the road arm and the opposite end anchored to said hull.

11. The hydromechanical control system of claim 1 further characterized by said spring being a pneumatic spring supported within said control arm.

12. The hydromechanical control system of claim 1 further characterized by a crankcase; said control means including relief valve means and an orifice; said relief valve means bypassing said orifice to relieve the system pressure back to said crankcase when an excessive bias is imposed on said friction damper means due to extremely violent movements induced in the road arm because of rough terrain.

13. The hydromechanical control system of claim 1 further characterized by having an electrohydraulic pressure control system with a hull motion sensor and a road arm motion sensor and including an active damping controller which will respond to signals from said hull motion sensor and said road arm motion sensor so as to generate a control signal for conditioning said control means to override said friction damper means during jounce movement of said road arms.

14. The hydromechanical control system of claim 1 further characterized by said control means including cam configurations and rebound and jounce pumps operated by said cam configurations; said cam configurations adaptable for use on either the right of left side of the hull so as to reduce the number of parts in the vehicle suspension system.

15. The hydromechanical control system of claim 14 further characterized by said rebound and jounce pumps having cam followers and spring loaded pistons that are operable either in a left side mounted road arm or in a right mounted road arm so as to further reduce the number of parts in the vehicle suspension system.

16. The hydromechanical control system of claim 13 further characterized by bump stops and means for controlling the limits of control of said active damping controller to produce first and second levels of damping the lowest of which is established to enable the spring support for the vehicle to act to absorb or swallow road arm movements as the road arms are forced by rough terrain bumps toward the hull and wherein further undamped movement of the road arms are absorbed by said bump stops which intercepts the road arms and cause the road arms to lift the vehicle over the rough terrain bumps and wherein on reverse road arm movement away from the hull, the higher damping level of said first and second levels of damping is selected such that the road arms and road wheels will engage the terrain and damp vehicle movement toward the terrain in conjunction with the spring action of said spring means and in conjunction with energy absorption produced by engagement of said bump stop and the road arms following full energy storage by said spring means; full energy absorption by said friction damper means and full engagement of the bump stop with the road arms.

* * * * *